(12) United States Patent
Schuller et al.

(10) Patent No.: US 6,361,295 B2
(45) Date of Patent: *Mar. 26, 2002

(54) MEANS FOR CONNECTING A CLOSURE PART TO A BUSH OF A PISTON PUMP FOR A BRAKE SYSTEM

(75) Inventors: Wolfgang Schuller, Sachsenheim; Andreas Weh, Durach, both of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,559
(22) PCT Filed: Jun. 18, 1998
(86) PCT No.: PCT/DE98/01672
  § 371 Date: Jun. 10, 1999
  § 102(e) Date: Jun. 10, 1999
(87) PCT Pub. No.: WO99/06708
  PCT Pub. Date: Feb. 11, 1999

(30) Foreign Application Priority Data

Jul. 30, 1997 (DE) .......................... 197 32 818

(51) Int. Cl.⁷ .............................. F04B 39/10
(52) U.S. Cl. ................. 417/549; 417/554; 417/569; 92/171.1
(58) Field of Search .................. 417/569, 549, 417/554; 92/171.1; 137/539

(56) References Cited

U.S. PATENT DOCUMENTS

| | | | | |
|---|---|---|---|---|
| 3,596,822 A | * | 8/1971 | Holley | 229/15 |
| 3,877,617 A | * | 4/1975 | Stevens | 222/321 |
| 5,123,819 A | * | 6/1992 | Schuller et al. | 417/569 |
| 5,280,746 A | * | 1/1994 | Siegel | 417/554 |
| 5,580,226 A | * | 12/1996 | Staib | 417/549 |
| 6,109,896 A | * | 8/2000 | Schuller et al. | 417/549 |

FOREIGN PATENT DOCUMENTS

EP 275413 A1 * 7/1988 ................. 137/545

* cited by examiner

Primary Examiner—Cheryl J. Tyler
(74) Attorney, Agent, or Firm—Ronald E. Greigg

(57) ABSTRACT

A piston pump for a hydraulic brake system of a vehicle with slip control. The piston pump has a piston which is received in a bush that is inserted into a cylinder bore of a pump housing that is closed in pressure-tight fashion by a closure part. For simpler assembly, the closure part is connected to the bush by means of a snap or detent connection. As a result, a preassembled unit that can be manipulated easily before insertion into the pump housing is obtained in a simple way.

6 Claims, 3 Drawing Sheets

MEANS FOR CONNECTING A CLOSURE PART TO A BUSH OF A PISTON PUMP FOR A BRAKE SYSTEM

PRIOR ART

The invention relates to a piston pump for a brake system.

The piston pump of the invention is intended in particular as a pump in a brake system of a vehicle and is used to control the pressure in wheel brake cylinders. Depending on the type of brake system, the abbreviations ABS, ASR, FDR and EHB are used for such brake systems. In the brake system, the pump serves for instance to return brake fluid from a wheel brake cylinder or a plurality of wheel brake cylinders to a master cylinder (ABS) and/or to pump brake fluid out of a supply container into a wheel brake cylinder or a plurality of wheel brake cylinders (ASR or FDR or EHB). In a brake system with wheel slip control (ABS or ASR) and/or a brake system serving as a steering aid (FDR) and/or an electrohydraulic brake system (EHB), the pump is needed. With the wheel slip control (ABS or ASR), locking of the wheels of the vehicle during a braking event involving strong pressure on the brake pedal (ABS) and/or spinning of the driven wheels of the vehicle in the event of strong pressure on the gas pedal (ASR) can for instance be prevented. In a brake system serving as a steering aid (FDR), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or wheel brake cylinders if an electric brake pedal sensor detects an actuation of the brake pedal, or in which the pump is used to fill a reservoir of the brake system.

One such piston pump is known from German Patent Disclosure DE 40 27 794 A1. The known piston pump has a piston which is guided axially displaceably in a bush that is inserted into a cylinder bore of a pump housing. On one face end of the bush, the cylinder bore is closed by a closure part, which is inserted in pressure-tight fashion into the cylinder bore of the pump housing. Before insertion into the pump housing, the closure part is joined to the bush by crimping, resulting in an easily manipulated preassembled unit that is simple to insert into pump housing. A disadvantage is that the closure part must be joined to the bush in an additional work step.

ADVANTAGES OF THE INVENTION

In the piston pump of the invention, the closure part and the bush are joined together by means of a snap or detent connection. This has the advantage that the bush and the closure part are joined together by simply being put together before insertion into the pump housing. An additional connection operation, for instance crimping as known from the prior art, is dispensed with. The bush and the closure part form an easily manipulated preassembled unit, which can be inserted into the pump housing simply, for instance by press-fitting. Since the connection between the closure part and the bush has only a secondary function, it must hold the closure part on the bush until the piston pump has been inserted into the pump housing; then an approximately aligned orientation of the closure part and the bush suffices, and sealing between the closure part and the bush is unnecessary, so that a snap or detent connection suffices. After insertion into the pump housing, the closure part and the bush are held in a position aligned with one another by the pump housing; sealing exists between the pump housing and the bush, or the closure part. The connection between the closure part and the bush has no further importance once these two parts have been inserted into the pump housing. A snap connection, which can be undone again by pulling the closure part and the bush apart, suffices to connect the closure part to the bush. A detent connection that cannot be done is equally suitable for connecting the closure part to the bush.

Advantageous features and refinements of the invention defined herein are the subject of the invention.

BRIEF DESCRIPTION OF THE DRAWINGS

The invention will be described in further detail in terms of an exemplary embodiment shown in the drawings. Shown are.

DESCRIPTION OF THE EXEMPLARY EMBODIMENT

Figure 1:
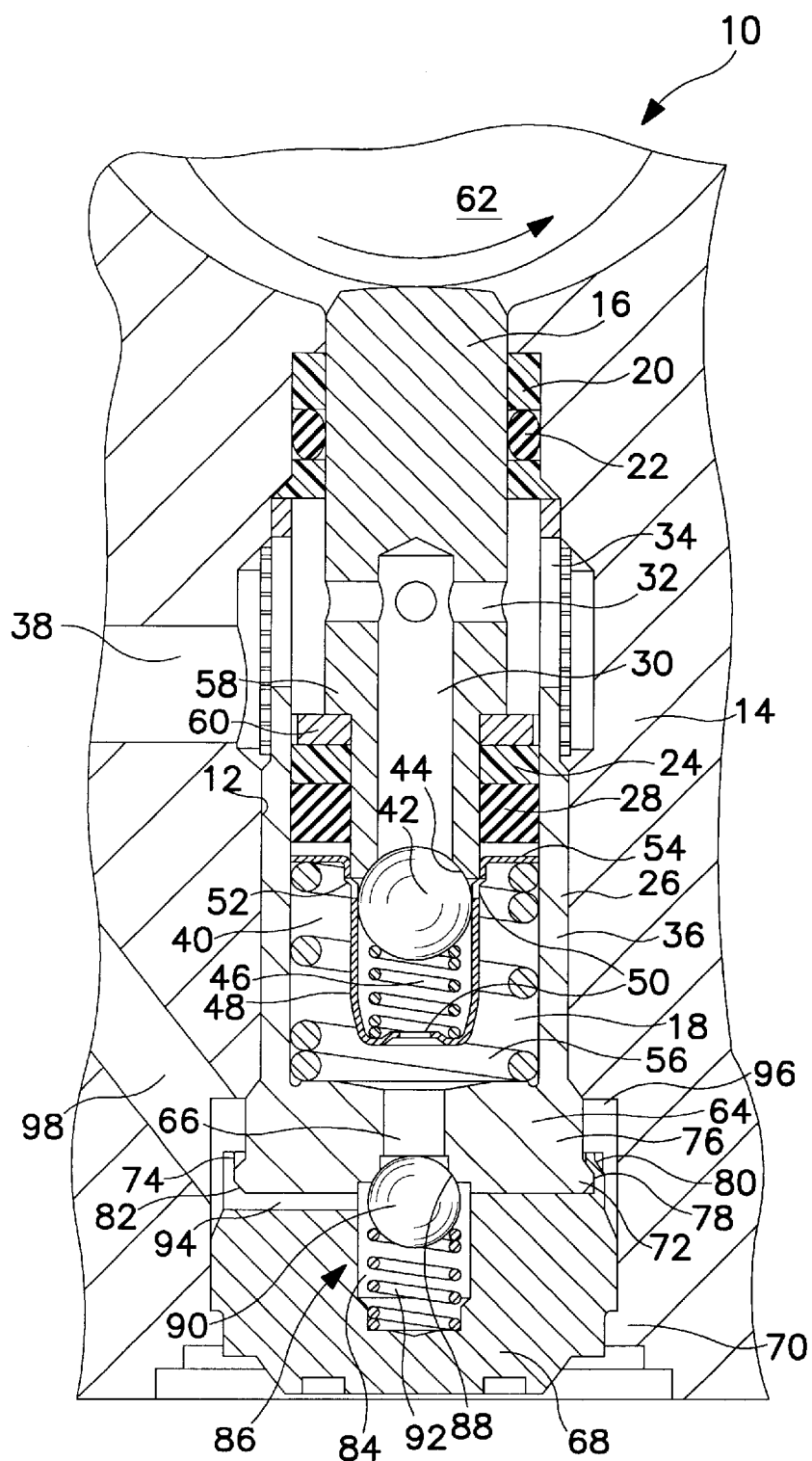
FIG. 1, an axial section through a piston pump of the invention.
Figure 2:
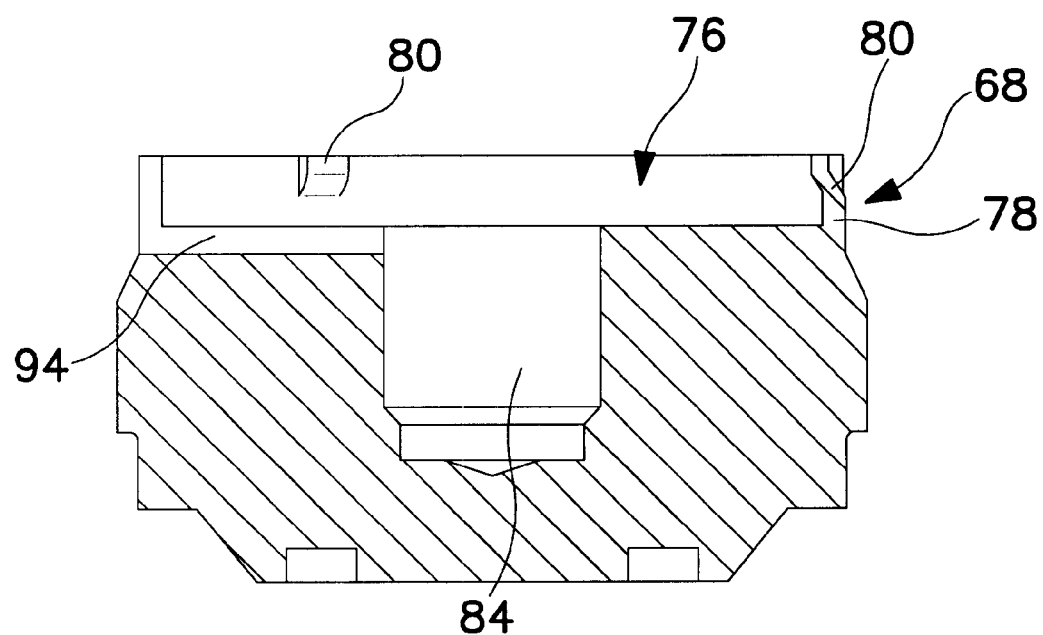
FIG. 2, an axial section through a closure part of the piston pump of the invention, on a larger scale.

The piston pump of the invention, identified by reference numeral 10, and shown in FIG. 1 is inserted into a stepped cylinder bore 12, which is mounted in a hydraulic block that forms a pump housing 14. The hydraulic block, of which only a fraction surrounding the piston pump 10 is shown in the drawing, is part of a slip-controlled hydraulic brake system a vehicle, not otherwise shown. Also inserted into the block, besides the piston pump 10, are such other hydraulic components as magnet valves or pressure reservoirs, which are hydraulically connected in the block to one another and to the piston pump 10 of the invention.

The piston pump 10 has a piston 16, one end of which, remote from a positive-displacement chamber 18, protrudes from a bush 26 and is guided in the pump housing 14 with a guide ring 20 and sealed off by a sealing ring 22. Another end of the piston 16, toward the positive-displacement chamber 18, is located in the bush 26 and is guided in the bush 26 of the piston pump 10 by a guide ring 24 and sealed off by a sealing ring 28. The bush 26 is inserted with a press fit into the cylinder bore 12 of the pump housing 14. The press fit brings about sealing between the inlet and outlet sides, that is, the low- and high-pressure sides of the piston pump 10.

For the pump inlet, an axial blind bore 30 is made in the piston 16 from the side toward the positive-displacement chamber; near its bottom, it is intersected by transverse bores 32. The blind and transverse bores 30, 32 communicate through windows 34 in a circumferential wall 36 of the bush 26 with an inflow bore 38 which is made radially to the piston pump 10 in the hydraulic block forming the pump housing 14.

On the end of the piston 16 toward the positive-displacement chamber, a check valve is mounted as an inlet valve 40: the inlet valve 40 has a valve ball 42 as its valve closing body, which cooperates with a conical valve seat 44 mounted at an orifice of the blind bore 30 of the piston 16. A helical compression spring as the valve closing spring 46 presses the valve ball 42 against the valve seat 44. The valve ball 42 and the valve closing spring 46 are received in a valve housing 48, which is made as a cup-shaped deepdrawn sheet-metal part with a diameter approximately equivalent to the diameter of the piston 16 and which is provided with flow openings 50. The valve housing 48 has an annular shoulder 52, with which it rests on a face end of the piston 16 toward the positive-displacement chamber 18. It has an outward-protruding radial flange 54 integral with it, against which a helical compression spring as a piston restoring spring 56 presses and in this way keeps the valve housing 48 against the piston 16. The radial flange 54 at the same time holds the guide ring 24 and the sealing ring 28 axially on the piston 16 between itself and a support ring 60 supported on an annular shoulder 58 of the piston 16. The piston restoring spring 56 is considerably stronger than the valve closing spring 46. The piston restoring spring 56 holds the valve housing 48 on the piston 16 counter to the force of the valve closing spring 46.

Via the radial flange 54 of the valve housing 48, the piston restoring spring 56 presses the piston 16 axially against an eccentric element 62, which can be driven by an electric motor and serves in a manner known per se to drive the piston 16 to execute a reciprocating stroke motion.

On a side toward the positive-displacement chamber, the bush 26 has a bush bottom 64, which is integral with it and in which a continuous center hole 66 for the pump outlet is made.

On the side toward the positive-displacement chamber, a closure part 68, which takes the form of a cylindrical plug, is inserted into the cylinder bore 12 and secured by a caulking 70 and sealed off in fluid tight fashion in the pump housing 14. At the same time, the closure part 68 holds the bush 26 in the cylinder bore 12.

The closure part 68 is joined to the bush 26 via a snap connection: On its bush bottom 64, the bush 26 has a radial collar 72, which forms an undercut 74 on its side remote from the closure part 68. The bush 26 is inserted with its bush bottom 64 into a cylindrical indentation 76 in the face end of the closure part 68 toward the bush 26. The radial collar 72 on the bush bottom 64 is located inside a hollow-cylindrical edge 78 of the closure part 68 that surrounds the cylindrical indentation 76.

Figure 3:
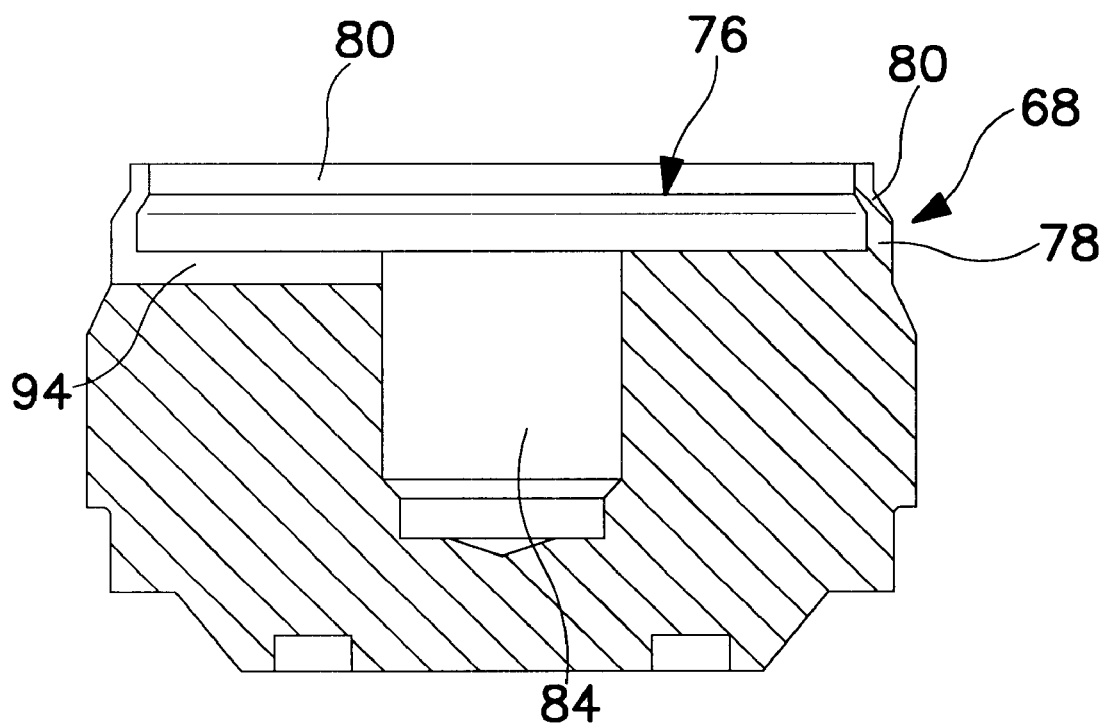
FIG. 3 is a modification of FIG. 2 which illustrates a snap or detent bead extending around the inner surface.

Three radially inward-protruding snap-on nipples 80 are impressed into the hollow-cylindrical edge 78, distributed over the circumference; they engage the radial collar 72 of the bush 26 from behind and in this way keep the closure part 68 on the bush bottom 64. Joining the closure part 68 to the bush 26 is effected by simply pressing these two parts together; a chamfer 82 on the radial collar 72 of the bush 26 elastically widens the hollow-cylindrical edge 78 at the snap-on nipples 80, until the snap-on nipples 80 have overcome the radial collar 72 and engage it from behind. Instead of individual snap-on nipples 80, a single snap bead 80 extending all the way around may be formed on the edge 78 of the closure part 68 as shown in FIG. 3.

The closure part 68 can be made either by metal-cutting methods or without metal-cutting, for instance by upsetting. The snap-on nipples 80 can be made, after the production of the hollow-cylindrical edge 78 of the closure part 68, by axially pressing on a deforming tool, not shown and hereafter referred to as a bell, which grips the hollow-cylindrical edge 78 and has three inward-protruding cams that shape the snap-on nipples 80. No counterpart tool which counter-holds the hollow-cylindrical edge 78 from the inside is needed for the purpose.

Another option for producing the snap-on nipples 80 is to introduce a die, not shown, into the cylindrical indentation 76; this die has recesses on its circumference that are complementary to the snap-on nipples 80. The snap-on nipples 80 are formed into these recesses, for instance by means of the bell described in the previous paragraph. Once the bell is pulled off, the die can be pulled out of the cylindrical indentation 76 because of the elasticity of the hollow-cylindrical edge 78. This way of producing the snap-on nipples 80, when the closure part 68 is produced by deforming, has the advantage that the snap-on nipples 80 can be made in a single operation jointly with the closure part 68. The die described, which is introduced into the cylindrical indentation 76, is in this case part of a multi-part deforming tool, not shown. The die forms the indentation 76 and preferably also the blind bore 84 by means of an extension on the die.

The closure part 68 is joined to the bush 26 before insertion into the pump housing 14. Connecting the closure part 68 to the bush 26 creates a preassembled unit that is easy to manipulate. Connecting the closure part 68 to the bush 26 is important only until these two parts are inserted into the pump housing 14, because after the insertion into and caulking in the pump housing 14, the bush 26 and closure part 68 are held on one another and aligned with one another by the pump housing 14.

An axial blind bore 84 is made in the closure part 68 on a bottom of the cylindrical indentation 76, and a check valve acting as an outlet valve 86 is accommodated in this bore and cooperates with a conical valve seat 88, which is made at an orifice, toward the closure part 68, of the center hole 66 in the bush bottom 64. A valve ball 90 is inserted as a valve closing body into the blind bore 84 of the closure part 68 and is pressed against the valve seat 88 by a helical compression spring acting as a valve closing spring 92.

As the pump outlet, a radial groove 94 is made in the bottom of the cylindrical indentation 76 of the closure part 68; it discharges into the blind bore 84 that receives the outlet valve 86, and it passes through the hollow-cylindrical edge 78 of the closure part 68. The radial groove 94 communicates via an annular conduit 96 with an outlet bore 98 made in the pump housing 14.

By means of the snap-on nipples 80 on the relatively thin edge 78, a certain elasticity is engendered, viewed in the radial direction, between the bush 26 and the closure part 68, so that when the bush 26 is installed together with the closure part 68 in the pump housing 14, errors of alignment, which can never be entirely avoided, are easily compensated for.

The foregoing relates to a preferred exemplary embodiment of the invention, it being understood that other variants and embodiments thereof are possible within the spirit and scope of the invention, the latter being defined by the appended claims.

We claim:

1. A piston pump comprising a pump housing, a piston that is driven to execute a reciprocating stroke motion and that is received axially displaceably in a bush which is inserted into said pump housing, a closure part which is inserted into the pump housing, said closure part closes the pump housing in pressure-tight fashion on one face end of the bush, and the closure part (68) is joined to the bush (26) by means of one of a snap and detent connection (72, 74, 80), the snap and detent connection (72, 74, 80) includes at least one snap nipple (80) on a hollow-cylindrical edge (78) and the snap-detent connection (72, 74, 80) has a chamfer (82) which during a compression of the bush (26) and the closure part (68), the hollow-cylindrical edge (78) is widened by the chamfer (82).

2. The piston pump according to claim 1, in which the bush (26) has an undercut (74), which is engaged by the hollow-cylindrical edge (78) of the closure part (68).

3. The piston pump according to claim 2, in which the hollow-cylindrical edge (78) of the closure part (68) has at least one of a snap and detent nipple (80), which engages the undercut (74) of the bush (26).

4. The piston pump according to claim 2, in which the hollow-cylindrical edge (78) of the closure part (68) has a snap bead extending all the way around, which engages the undercut (74) of the bush (26).

5. The piston pump according to claim 1, in which a check valve (86) is inserted into a bore of the closure part (68).

6. The piston pump according to claim 5, in which the bush (26) has a bush bottom (64) with a through hole (66) toward the closure part at which a valve seat (88) for the check valve (86) is formed.

* * * * *